United States Patent
Cooper

(10) Patent No.: US 11,693,123 B2
(45) Date of Patent: Jul. 4, 2023

(54) LEVERAGING OPERATIONS DEPOTS FOR ANTENNA PLACEMENT TO GATHER PHASE AND POSITION DATA

(71) Applicant: NEUTRON HOLDINGS, INC., San Francisco, CA (US)

(72) Inventor: Ashley Cooper, San Francisco, CA (US)

(73) Assignee: Neutron Holdings, Inc., San Francisco, CA (US)

( * ) Notice: Subject to any disclaimer, the term of this patent is extended or adjusted under 35 U.S.C. 154(b) by 696 days.

(21) Appl. No.: 16/660,553

(22) Filed: Oct. 22, 2019

(65) Prior Publication Data

US 2021/0116581 A1     Apr. 22, 2021

(51) Int. Cl.
| | | |
|---|---|---|
| G01S 19/40 | (2010.01) | |
| G08G 1/00 | (2006.01) | |
| G01S 19/41 | (2010.01) | |
| G01S 19/07 | (2010.01) | |

(52) U.S. Cl.
CPC ............ *G01S 19/40* (2013.01); *G01S 19/071* (2019.08); *G01S 19/41* (2013.01); *G08G 1/20* (2013.01); *G08G 1/205* (2013.01); *G08G 1/207* (2013.01)

(58) Field of Classification Search
CPC .......... G08G 1/20; G08G 1/205; G08G 1/207
See application file for complete search history.

(56) References Cited

U.S. PATENT DOCUMENTS

| | | | |
|---|---|---|---|
| 9,194,955 B1 | 11/2015 | Fahrner et al. | |
| 9,448,083 B2 | 9/2016 | Loftus et al. | |
| 9,569,966 B2 | 2/2017 | Bobbitt | |
| 9,635,517 B2 | 4/2017 | Guo et al. | |
| 2005/0060091 A1* | 3/2005 | Garin | G01S 19/06 701/469 |
| 2011/0148626 A1* | 6/2011 | Acevedo | G01S 19/42 340/539.13 |
| 2016/0023636 A1* | 1/2016 | Keating | G08G 1/205 701/2 |
| 2019/0324150 A1* | 10/2019 | Konschak | G01S 19/41 |

(Continued)

FOREIGN PATENT DOCUMENTS

| | | | |
|---|---|---|---|
| CN | 107153211 A | * | 9/2017 |
| CN | 109910668 A | * | 6/2019 |
| JP | 1172549 A | * | 3/1999 |

(Continued)

OTHER PUBLICATIONS

S. Sand et al, Positioning in Wireless Communication Systems, John Wiley & Sons, Ltd, p. 14-15, 2014 (Year: 2014).*

(Continued)

*Primary Examiner* — Bernarr E Gregory
*Assistant Examiner* — Fred H Mull
(74) *Attorney, Agent, or Firm* — Dentons US LLP

(57) ABSTRACT

The present disclosure describes a system for dynamically determining an accurate location of a light electric vehicle. For example, if a light electric vehicle is within a predetermined distance of a location for which an accurate location determination is needed or required, a light electric vehicle management system may update the determined location of the light electric vehicle with a location correction factor that is based, at least in part, on a reference location provided by a stationary reference point.

19 Claims, 8 Drawing Sheets

(56) References Cited

U.S. PATENT DOCUMENTS

2020/0058065 A1* 2/2020 VanderZanden ....... G08G 1/207
2021/0063580 A1* 3/2021 Conquest ................ G01S 19/44

FOREIGN PATENT DOCUMENTS

| WO | WO-2017177929 A1 | * | 10/2017 |
| WO | WO-2017177978 A1 | * | 10/2017 |
| WO | 2018/083004 A1 | | 5/2018 |
| WO | WO-2018086612 A1 | * | 5/2018 |

OTHER PUBLICATIONS

M.M. Uddin et al., Current DGPS Techniques and Flight Applications, International Journal of Advanced Research in Computer and Communication Engineering, vol. 7(7), Jul. 2018 (Year: 2018).*
International Search Report from PCT/US2020/056483, dated Jan. 19, 2021.
Written Opinion of the ISA from PCT/US2020/056483, dated Jan. 19, 2021.

* cited by examiner

LEVERAGING OPERATIONS DEPOTS FOR ANTENNA PLACEMENT TO GATHER PHASE AND POSITION DATA

BACKGROUND

Electric vehicles, such as electric scooters and electric bicycles, are typically available for individuals to reserve and ride for a period of time. As such, providing an accurate location of these electric vehicles is important.

SUMMARY

The present disclosure describes a light electric vehicle management system that accurately detects a location of one or more light electric vehicles. In some examples, one or more functionalities or operating parameters of the light electric vehicle may be altered based, at least in part, on the detected location. For example, a location of one or more light electric vehicles may be determined by a Global Positioning System (GPS) or a Global Navigation Satellite System (GNSS). However, in some examples, the GPS data or the GNSS data may not be accurate. As such, the examples described herein describe how to increase the location accuracy for one or more light electric vehicles in a fleet of light electric vehicles.

Accordingly, the present disclosure describes a computer-implemented method for increasing the accuracy of a location determination of a light electric vehicle. The method includes receiving a reference location from a stationary reference point. The stationary reference point may be at least one of an operations depot associated with a fleet of light electric vehicles or a rechargeable battery kiosk for a rechargeable battery of the fleet of light electric vehicles. A current location of a light electric vehicle of the fleet of light electric vehicles may also be received. A determination may then be made that the current location of the light electric vehicle is within a predetermined distance of a location accuracy zone associated with a geographic location. A location correction factor is applied to the current location of the light electric vehicle to generate an updated location for the light electric vehicle. In some examples, the location correction factor is applied to the current location of the light electric vehicle based, at least in part, on the determination that the current location of the light electric vehicle is within the predetermined distance of the location accuracy zone. The location correction factor is based, at least in part, on the reference location. When the updated location is determined, it is transmitted to a remote computing device.

The present disclosure also describes a system having at least one processor and a memory communicatively coupled to the at least one processor. The memory stores instructions that, when executed by the at least one processor, perform operations. In some examples, the operations include receiving a light electric vehicle use request from a computing device associated with an individual. A location of the individual is determined and is based, at least in part, on the light electric vehicle use request. A location of a light electric vehicle is also determined. The light electric vehicle location is associated with the location of the individual. A location correction factor may be applied to the location of the light electric vehicle to generate an updated light electric vehicle location for the light electric vehicle. Additionally, the location correction factor is based, at least in part, on a reference location of a stationary reference point. The stationary reference point is at least one of an operations depot associated with a fleet of light electric vehicles or a rechargeable battery kiosk for a rechargeable battery of the fleet of light electric vehicles. The updated light electric vehicle location is then provided on a user interface of the computing device.

Also described is a method for determining a location of a light electric vehicle. The method includes determining that the current location of the light electric vehicle is within a predetermined distance of location accuracy zone associated with a geographic location. A reference location is then requested from a stationary reference point. In some examples, the stationary reference point is at least one of an operations depot associated with a fleet of light electric vehicles or a rechargeable battery kiosk for a rechargeable battery of the fleet of light electric vehicles. A location correction factor is generated based, at least in part, on the reference location. The correction factor may then be applied to the current location of the light electric vehicle to generate an updated current location of the light electric vehicle.

BRIEF DESCRIPTION OF THE DRAWINGS

Non-limiting and non-exhaustive examples are described with reference to the following Figures.

DETAILED DESCRIPTION

Figure 1:
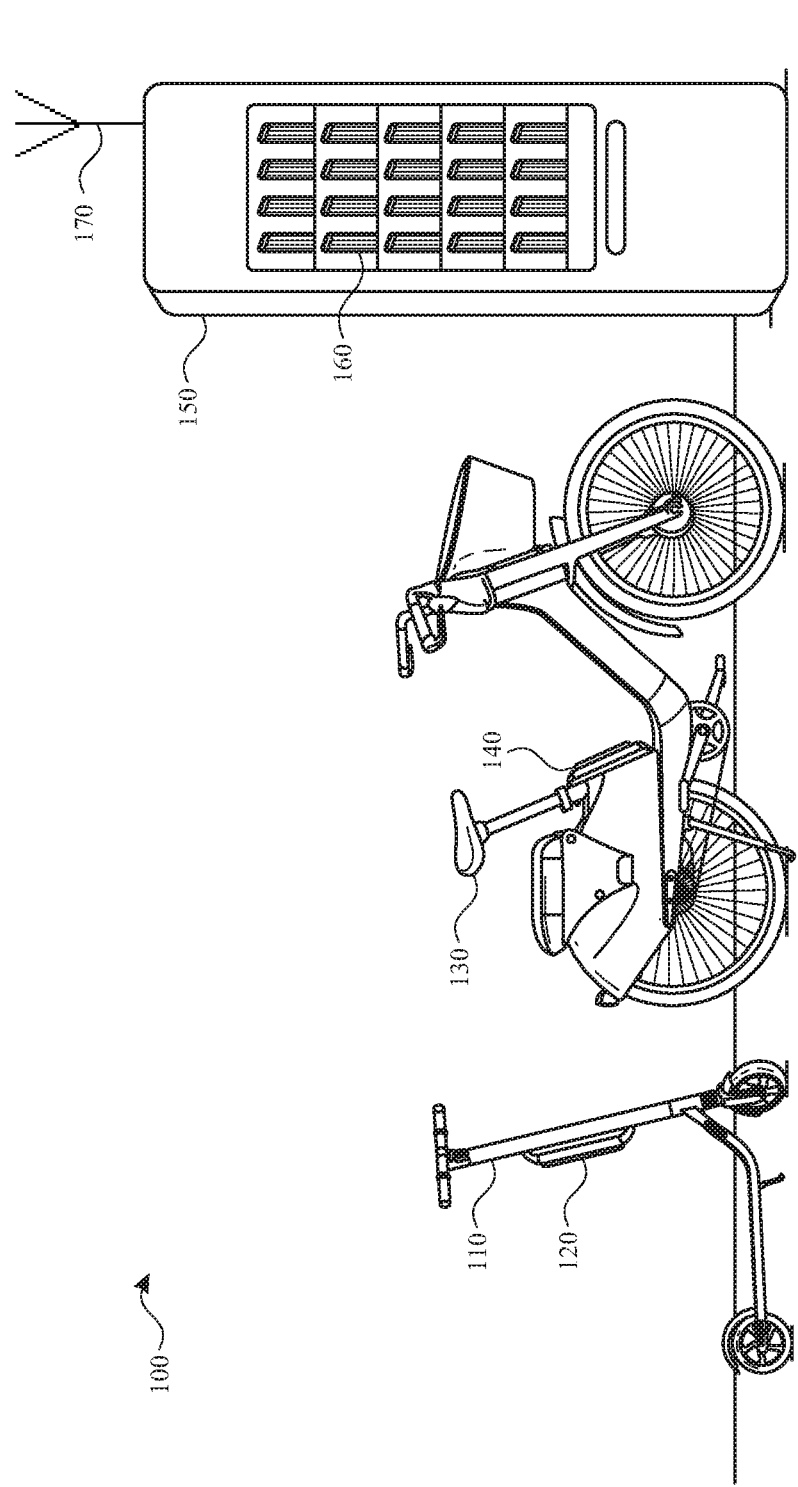
FIG. 1 illustrates a light electric vehicle ridesharing system according to an example.

In the following detailed description, references are made to the accompanying drawings that form a part hereof, and in which are shown by way of illustrations specific examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Electric ridesharing vehicles, such as electric assist bicycles (also referred to herein as "electric vehicles" or "light electric vehicles"), are typically available for various individuals to reserve and use for a period of time. For example, an individual may access an application on a computing device and submit a request to use a light electric vehicle. The location of the individual may be determined prior to, during or after the light electric vehicle use request is submitted. When the location of the individual is determined, one or more light electric vehicles that are in or are otherwise associated with the location of the individual are identified. The location of one or more of these light electric vehicles is then provided to a user interface of the computing device to inform the individual where she can go to pick up an available light electric vehicle. When the individual has finished using the light electric vehicle (e.g., the individual has reached her desired destination), the individual may end the use period and park the light electric vehicle at or near her destination.

Typically, the location of each of the light electric vehicles is provided by a global positioning system (GPS) associated or otherwise integrated with the light electric vehicle. However, in some cases, and depending on the environment in which the light electric vehicles are located, the GPS location information of the light electric vehicles may be inaccurate. For example, in a city with large buildings, skyscrapers and other structures (referred to herein as an "urban canyon"), the GPS information may become distorted or otherwise rendered inaccurate as these structures may cause interference between one or more GPS satellites and the light electric vehicles. In other examples, changes in the earth's atmosphere may cause distortions in the GPS signals. In some examples, the inaccuracy between the reported location of a particular light electric vehicle and the actual location of the particular light electric vehicle may be upwards of one hundred meters. Although GPS is specifically mentioned, the same can be true of signals received from a GNSS system.

As a result, when the detected location of the light electric vehicle is provided to the computing device of the individual in response to a use or reservation request, the individual may travel to the indicated location only to discover that the light electric vehicle is not there.

Ensuring an accurate location of a light electric vehicle is important from a customer satisfaction standpoint. Additionally, ensuring an accurate location of a light electric vehicle is also important from a fleet management standpoint.

For example, light electric vehicles typically need to be maintained and serviced. This includes recharging a rechargeable battery, fixing detected issues, removing light electric vehicles from certain areas during adverse weather conditions and performing other maintenance tasks. In some examples, one or more individuals are hired to perform these tasks. However, if the reported location of a light electric vehicle is not accurate, it may take additional time to track down the light electric vehicle. Not only does this increase operating costs of the fleet, but it also could potentially limit the amount of revenue generated by the reservation and use of the light electric vehicles.

In yet another example, some towns, cities, and municipalities may prohibit the reservation, use, and/or return of light electric vehicles at certain locations. For example, in a city with a boardwalk (e.g., Atlantic City) or pier (e.g., Santa Monica) or other high traffic areas, the reservation, use, and/or return of a light electric vehicle may be prohibited or restricted. As such, it is important to accurately determine a current location of a light electric vehicle if and/or when the light electric vehicle is operating in these areas or within a predetermined distance from these areas.

Accordingly, aspects of the present disclosure describe a light electric vehicle management system for managing and improving location detection for a fleet of light electric vehicles. Although light electric vehicles are specifically mentioned, the concepts described herein have a number of other uses. For example, the location accuracy improvements described herein may be used to better identify a current location of a vehicle and/or an individual in a ridesharing system. The improvement may include determining a more accurate location of an individual who is waiting for the ridesharing vehicle and providing the accurate location of the individual to a driver.

The light electric vehicle management system described herein receives a reference location from a stationary reference point. The stationary reference point may be any stationary structure that has fixed and known GPS coordinates. For example, an operations depot associated with a fleet of vehicles may serve as the stationary reference point. In another example, a rechargeable battery kiosk that recharges and houses rechargeable batteries for light electric vehicles may serve as the stationary reference point. Although specific examples are given, other stationary structures associated with a provider of the fleet of light electric vehicles and/or a ridesharing system may serve as the stationary reference point. Although GPS information is used throughout the disclosure, the methods and systems described herein may also be used with GNSS data and other such location information.

As described above, the stationary reference point has fixed and known GPS coordinates. At various times, the stationary reference point may receive or otherwise measure incoming timing and phase signals from various GPS satellites. Because the reference point is stationary and its location is known and does not change, the stationary reference point (or a light electric vehicle management system) can calculate distortions in timing due to changes in the Earth's ionosphere. This information is used to determine a location correction factor that can be applied to location information received from a fleet of light electric vehicles, ridesharing vehicles, ridesharing vehicle passengers and/or individuals that access the light electric vehicle location management system.

The updated location information can assist an individual in locating a light electric vehicle, assist a driver of a ridesharing vehicle in locating a passenger, and/or be used to limit the functionality of a light electric vehicle when the light electric vehicle is within a predetermined distance from, is approaching and/or is in a "location accuracy zone". As used herein, the term "location accuracy zone" is a geographic area in which light electric vehicle reservation, use, return and/or parking may be restricted or prohibited. The location accuracy zone may be defined or otherwise indicated by a particular town, city or municipality.

In some examples, the location management system may dynamically determine which light electric vehicles in a fleet would benefit from or otherwise need the updated location provided by the light electric vehicle location management system. For example, light electric vehicles in an urban canyon may benefit from the updated location information when compared to light electric vehicles that are not located in such an environment. In other examples, a determined route or anticipated destination may bring the light electric vehicle within or near a location accuracy zone. In such examples, the light electric vehicle management system may determine that a more accurate location for the particular light electric vehicle is needed due to the proximity of the light electric vehicle to the location accuracy zone. For example, if the light electric vehicle is within fifty feet of a location accuracy zone but the light electric vehicle management system determines, based on inaccurate location information, that the light electric vehicle is within the location accuracy zone, one or more operating parameters of the light electric vehicle may be unnecessarily restricted or altered.

However, if the light electric vehicle enters the location accuracy zone, the light electric vehicle management system may send instructions to the light electric vehicle that limits or prohibits use of the light electric vehicle in that area. For example, the light electric vehicle management system may cause an electric assist motor of the light electric vehicle to stop providing power to the light electric vehicle when the light electric vehicle is within the location accuracy zone. In another example, the light electric vehicle management system may prohibit the termination of a reservation or use period if and when the light electric vehicle is parked in the location accuracy zone.

These and other features will be described in more detail below with respect to FIG. 1-FIG. 5.

FIG. 1 illustrates an example environment 100 in which aspects of the present disclosure may be practiced. As illustrated, environment 100 includes an electric scooter(s) 110, an electric bicycle(s) 130, and a rechargeable battery kiosk(s) 150. It will be appreciated that the electric scooter 110 and the electric bicycle 130 are provided as example light electric vehicles and that, in other examples, aspects described herein apply to other types of light electric vehicles.

As described herein, the environment 100 includes a network service that receives information from the electric scooter 110 and/or the electric bicycle 130 (also referred to herein as light electric vehicles) over a network communication channel (e.g., one or more networks, the Internet, etc.). The information enables an individual, using a client application executing on a computing device, to locate, request, and/or reserve (e.g., rent or borrow for a duration of time) one or more light electric vehicles.

In some examples, the network service includes one or more computing systems or servers that are remote from the computing device of the individual and the light electric vehicles. The one or more computing systems includes an application programming interface (API) that enables the one or more computing systems to receive information from, send information to, and otherwise interact with the computing device, the light electric vehicles 110, 130 and/or the rechargeable battery kiosk(s) 150.

For example, the client application executing on the computing device of the individual receives, from the network service over the network communication channel, information about a location of one or more of the light electric vehicles. The location of each of the light electric vehicles can then be provided on a user interface of the client application.

In one example, the user interface of the client application includes a map that displays a determined location of the individual and/or a determined location of the light electric vehicles. In some examples, the determined location of the individual and/or the determined location of the light electric vehicles is based, at least in part, on Global Positioning System (GPS) data Global Navigation Satellite System (GNSS) data or other location information received by the network service over the network communication channel.

The user interface of the client application displays the location information of the individual and the light electric vehicles as different icons (or other such representations).

Once the location information is displayed, the individual may select an icon representing a type of light electric vehicle (e.g., an icon for an electric scooter 110 or an icon for an electric bicycle 130). The user interface of the client application then generates or determines a route (e.g., provides directions) from the individual's current location to the selected light electric vehicle. Selection of one of the icons may also enable the individual to reserve (e.g., place a hold on) the light electric vehicle (to ensure that the light electric vehicle will be at the determined location when the individual arrives), rent the light electric vehicle and/or borrow the light electric vehicle for a period of time.

Each light electric vehicle and/or the network service also includes a location tracking system that tracks, receives and/or determines a location of each light electric vehicle as they are used. In some examples, the location tracking system tracks the location information of the light electric vehicle in real-time or substantially real-time. In other examples, the location tracking system determines the location information of the light electric vehicle at periodic intervals (e.g., every minute, every five minutes, every ten minutes, etc.). In yet other examples, the location tracking system may track the location of the light electric vehicle in real-time or substantially real-time when the light electric vehicle is reserved, rented or otherwise used by an individual and may track location information at periodic intervals when the light electric vehicle has been reserved or is otherwise not in use.

The one or more computing systems of the network service also include one or more databases that store information about each of the light electric vehicles and/or the rechargeable battery kiosk(s) 150. For example, the one or more databases may store location information for each light electric vehicle and/or the rechargeable battery kiosk(s) 150, rechargeable battery status information for rechargeable batteries used by each light electric vehicle and/or in the rechargeable battery kiosk(s) 150, rechargeable battery kiosk information (e.g., the number of rechargeable batteries housed by the rechargeable battery kiosk 150), and/or light electric vehicle status information (e.g., how many times the light electric vehicle has been reserved, whether the light electric vehicle is damaged, whether the light electric vehicle should be serviced, etc.).

The one or more databases may also store information about the individual. This information may include a profile of the individual (e.g., username, contact information, etc.) security credentials of the individual (e.g., a password), historical usage data, payment information and the like.

The one or more computing systems of the network service may also include a matching system. The matching system receives, manages or otherwise handles various requests from the individual. The requests may include light electric vehicle rental requests and light electric vehicle reservation requests. For example, when a vehicle rental request is received from the client application executing on the individual's computing device, the matching system may communicate with the location tracking system and determine which light electric vehicle should be matched with or otherwise assigned to the requesting individual.

The one or more computing systems of the network service may also include a payment system that processes payment information of the individual. For example, when an individual rents and uses a light electric vehicle, the individual may be charged for the usage based on a duration of use and/or a travel distance. Once the individual has finished using the light electric vehicle (e.g., by arriving at her intended destination, a check-in point, a rechargeable battery kiosk 150, etc.), the payment system may automatically process the payment information of the individual.

As discussed above, the environment 100 includes one or more light electric vehicles including, but not limited to, an electric scooter 110 and an electric bicycle 130. In examples, the electric scooter 110 includes vehicle components (e.g., wheels, axles, baseboard, handlebar, braking mechanisms, etc.), one or more electric motors, control systems, sensors, speakers, and/or lights, which may be powered by a rechargeable battery. The rechargeable battery may be secured to the electric scooter 110 by a battery holster 120.

Likewise, and in some examples, the electric bicycle 130 includes vehicle components (e.g., wheels, axles, chains, gear ratios, bicycle seat, handlebar, bicycle frame, braking mechanisms, etc.), one or more electric motors, control systems, sensors, speakers, and/or lights, which may also be powered by a rechargeable battery. The rechargeable battery may be secured to the electric bicycle 130 by a battery holster 140.

The control system of the electric scooter 110 and/or the electric bicycle 130 manages the power output to the one or motors, provides a visual indication as to a charge level of the rechargeable battery in the battery holster 120, and/or communicates directly (e.g., via Wi-Fi, Bluetooth, etc.) or indirectly (e.g., via one or more remote computing devices, one or more networks, the Internet, etc.) with the computing device of the individual and/or with the network service.

Example communications include, but are not limited to, initiating locking or unlocking of the electric scooter 110 or the electric bicycle 130 (e.g., initiating or ending a travel session), initiating a battery swap to exchange a rechargeable battery in the battery holster 120 or the battery holster 140 with one in a rechargeable battery kiosk 150, determining a location and/or status information of the electric scooter 110 or the electric bicycle 130, and determining a location of a rechargeable battery and/or a rechargeable battery kiosk 150. Lights, speakers, and/or other output devices of the electric scooter 110 or the electric bicycle 130 may be used to provide an indication as to the location of the electric scooter 110 or the electric bicycle 130 or as an anti-theft mechanism, among other examples.

In some examples, the rechargeable battery kiosk 150 may act as a stationary reference point (e.g., stationary reference point 250 (FIG. 2A)) that may be used to determine errors in received GPS signals. These errors may occur due to changes in the Earth's atmosphere.

For example, the atmosphere includes an ionosphere. The ionosphere is a layer of the Earth's atmosphere that contains ions and electrons. These ions and electrons cause the ionosphere to reflect radio waves and other signals. Additionally, the ionosphere grows and shrinks due, in part, to energy absorbed from the sun. As such, as GPS signals pass through the ionosphere, some of the speed and/or the direction of the GPS signal may be altered thereby causing inaccurate GPS signals and inaccurate location information. Because the ionosphere grows and shrinks, the inaccuracies of the GPS signals may also change over time.

However, because the GPS coordinates or exact location of the rechargeable battery kiosk 150 (or other stationary reference point) are known, the coordinates or exact location of the rechargeable battery kiosk 150 may be used to determine a location correction factor that is applied to a detected location of a light electric vehicle. As such, the rechargeable battery kiosk 150 may be equipped or otherwise associated with a GPS system or other location detection mechanism (represented by antenna 170).

As shown in FIG. 1, each light electric vehicle includes a battery holster. For example, the battery holster 140 is affixed to the seat tube of the electric bicycle 130, while the battery holster 120 is illustrated as being affixed to the handlebar column of the electric scooter 110. It will be appreciated that the locations of the battery holsters 120 and 140 are provided as examples, and that a battery holster may be positioned in a variety of alternate locations in other examples. For example, the battery holster 140 may be affixed to the handlebar column or the cross bar of the electric bicycle 130. As another example, the battery holster 120 may be affixed to the deck or located near the rear of the electric scooter 110.

The battery holsters 120 and 140 are each operable to receive a rechargeable battery. For example, an individual may operate a light electric vehicle for a period of time and then determine that the rechargeable battery in use by the light electric vehicle needs to be recharged. In some instances, the light electric vehicle, or the rechargeable battery itself, may communicate current battery charge information for the rechargeable battery to the computing device of the individual. In another example, the rechargeable battery and/or battery holster 120 and 140 may include a visual indicator to display the charge level of the rechargeable battery. As an addition or an alternative, the electrical vehicle, or the rechargeable battery itself, may communicate current battery charge information for the rechargeable battery to the network service, which can provide battery information to the computing device of the individual. When this occurs, the individual may be directed to a rechargeable battery kiosk 150. For example, the network service can transmit data, over one or more networks, to the computing device to cause the computing device to display information about a particular rechargeable battery kiosk 150 to travel to.

When the individual arrives at the rechargeable battery kiosk 150, the individual may exchange the light electric vehicle's current battery with another rechargeable battery housed by the rechargeable battery kiosk 150, thereby enabling the light electric vehicle to continue or resume operation. In some instances, the individual can use the client application executing on the computing device of the individual to locate and/or select a rechargeable battery kiosk 150, receive directions to the rechargeable battery kiosk 150, and initiate a battery swap with the rechargeable battery kiosk 150 when the individual arrives at its location.

According to examples, when a battery swap is initiated, the control system of the light electric vehicle may enable the rechargeable battery 160 to be removed from a battery holster, such as battery holster 120 or 140. The rechargeable battery 160 may then be exchanged for a different rechargeable battery 160 housed by the rechargeable battery kiosk 150. The rechargeable battery 160 may subsequently be inserted into the battery holster of the light electric vehicle.

The rechargeable battery kiosk 150 stores and charges a set of rechargeable batteries 160. Each rechargeable battery 160 in the set can be used by both the electric scooter 110 and the electric bicycle 130. In some examples, multiple rechargeable battery kiosks 150 are located within a city, county, or other geographic region. For example, one rechargeable battery kiosk may be located in or otherwise associated with a first geographic area within a geographic region and another rechargeable battery kiosk may be located in or otherwise associated with a second geographic area within the geographic region.

Thus, when an individual is traveling through the geographic region on an light electric vehicle and wants or needs to exchange the light electric vehicle's current rechargeable battery for one that has more charge, the individual may be directed (e.g., via the client application executing on the individual's computing device) to the rechargeable battery kiosk 150 associated with the geographic region. When the individual arrives at the rechargeable battery kiosk 150, the individual can exchange their current rechargeable battery for one that is fully charged or substantially fully charged. This enables the individual to travel using a light electric vehicle across distances that may otherwise not be possible using the power provided by one charge of a rechargeable battery.

In some examples, the rechargeable battery kiosk 150 comprises a control system that communicates directly or indirectly with a computing device of the individual when performing a battery swap such as described above. In examples, the control system communicates with a remote computing device(s), e.g., that implements the network service, using a connection to one or more networks, such as a Wi-Fi network and/or a cellular network. The rechargeable battery kiosk 150 may receive and/or report rechargeable battery status information to a remote computing device(s). The battery status information can include, but is not limited to, battery charge levels, battery health, an amount of rechargeable batteries currently available at the rechargeable battery kiosk, and/or usage demand statistics.

Figure 2A:
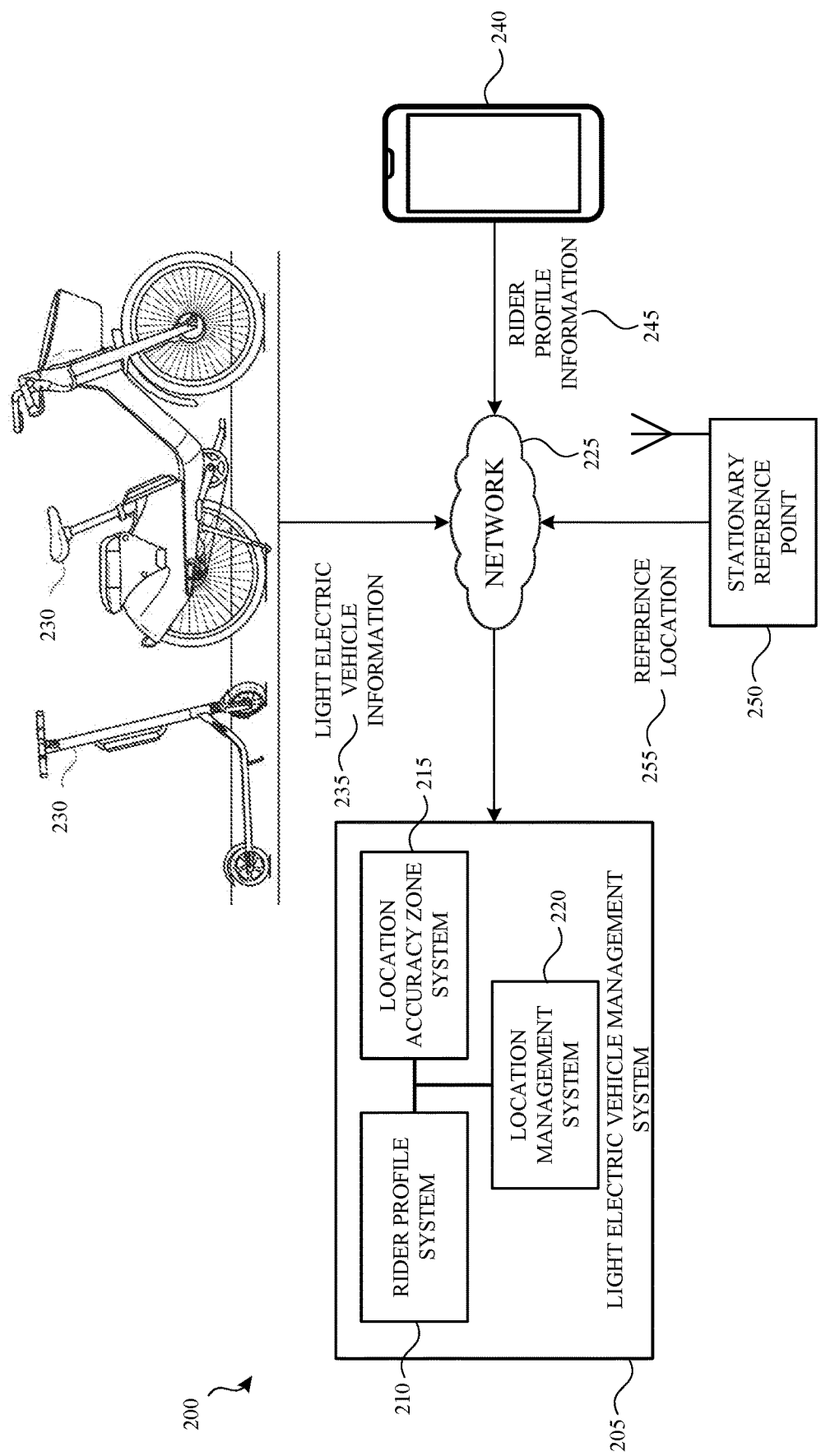
FIG. 2A illustrates a light electric vehicle management system for accurately determining a location of a light electric vehicle according to an example.

FIG. 2A illustrates a system 200 for updating a location or otherwise determining an accurate location of a light electric vehicle 230 according to an example. The system 200 may be used with any number of different light electric vehicles 230 including electric bicycles, electric scooters, and so on. Additionally, the system 200, or various subsystems and/or combinations thereof may be used in a ridesharing service in order to more accurately determine a location of a rider and/or a vehicle that is meeting the rider at a determined location.

Although FIG. 2A illustrates a single electric bicycle and a single electric scooter (collectively referred to as light electric vehicle(s) 230), the system 200, and more specifically, the light electric vehicle management system 205, may be used to track the location of various light electric vehicles 230 in a fleet and provide updated/accurate location information to one light electric vehicle 230 in a fleet of light electric vehicles or to multiple light electric vehicles 230 within the fleet simultaneously or substantially simultaneously. Once an accurate or updated location is determined, the location of the light electric vehicle 230 may be provided to a computing device 240 associated with an individual. In other examples and as will be described in more detail below, when a light electric vehicle 230 is within a predetermined distance from, is approaching or is operating within a particular geographic area (referred to herein as a location accuracy zone), the light electric vehicle management system 205 may request a more accurate location of the light electric vehicle in order to determine whether one or more operating parameters or functionalities of the light electric vehicle 230 should be altered.

The system 200 includes a light electric vehicle management system 205. The light electric vehicle management system 205 may include a rider profile system 210, a location accuracy zone system 215, and a location management system 220. In order to detect and/or update a location of the light electric vehicle 230 and/or in order to provide a more accurate location of the light electric vehicle 230 (or verify the location of the light electric vehicle 230), the light electric vehicle management system 205 may receive different types of information from a variety of different sources.

For example, and as shown in FIG. 2A, the light electric vehicle management system 205 may receive light electric vehicle information 235 from a light electric vehicle 230 over a network 225. Additionally, the light electric vehicle management system 205 may receive rider profile information 245 from a computing device 240 associated with an individual over the network 225. As will be explained in more detail below, the light electric vehicle management system 205 may use the received information to detect a current location of the light electric vehicle 230 and/or determine an anticipated destination of the light electric vehicle 230. The light electric vehicle management system 205 may also determine whether a location correction factor should be applied to the determined location of the light electric vehicle 230.

As part of determining whether a location correction factor should be applied to a determined location of the light electric vehicle 230, the light electric vehicle management system 205 and/or the location management system 220 may receive a reference location 255 from a stationary reference point 250. The stationary reference point 250 may include an antenna or other components or systems that measure or receive phase and position data from various GPS satellites. In some examples, a rechargeable battery kiosk (e.g., rechargeable battery kiosk 150 (FIG. 1)) may act as a stationary reference point 250. In another example, an operations depot associated with the fleet of light electric vehicles in a particular geographic area or geographic region may act as the stationary reference point 250. Although specific examples are given, the stationary reference point 250 may be any reference point for which GPS coordinates are fixed and known. Additionally, although one stationary reference point 250 is shown in FIG. 2A, the system 200 may include any number of stationary reference points 250 and receive reference locations 255 automatically and/or in response to a request for a reference location 255 (e.g., from the light electric vehicle management system). The location management system 220 may also receive a reference location 255 from one or more of the stationary reference points 250 simultaneously or substantially simultaneously.

As discussed above, as location signals between light electric vehicles 230 and GPS satellites are transmitted back and forth, the earth's atmosphere may cause errors in the GPS signals. For example, as the earth's ionosphere grows and shrinks due, in part, to absorbing energy from the sun, the GPS signal may be altered. As a result, a reported current location of the light electric vehicle 230 may be inaccurate. However, because the GPS coordinates or exact location of the stationary reference point 250 is known, the GPS coordinates or exact location of the stationary reference point 250 may be used to determine a location correction factor that can be applied to a detected location of the light electric vehicle 230.

For example, the stationary reference point 250 may request, detect or otherwise receive location information about its current location from one or more GPS satellites. This information, referred to as the reference location 255, may be provided to the location management system 220 over the network 225. The reference location 255 may include or otherwise be associated with an identifier so the location management system 220 may determine from which stationary reference point 250 the reference location 255 originated.

The location management system 220 may also store and/or receive the known GPS coordinates of the stationary reference point 250. As such, the location management system 220 may compare the GPS coordinates in the reference location 255 to the actual known GPS coordinates of the stationary reference point 250 to determine a location correction factor that should be applied to various light electric vehicles 230 in a geographic area or region associated with the stationary reference point 250.

For example, when the reference location 255 is received, the location management system 220 may determine, receive or otherwise measure the timing and phase signals from one or more GPS satellites that provided the reference location 255. Because the stationary reference point 250 is at a fixed location and its GPS coordinates do not change, the location management system 220 can determine the severity of the timing and phase distortions and, as a result, calculate an appropriate location correction factor.

As the location management system 220 requests or otherwise receives location information (e.g., light electric vehicle information 235) from light electric vehicles 230 in a geographic area, the location management system 220 may apply the determined location correction factor to the location information associated with the light electric vehicle 230.

In some examples, the determination of the location correction factor may occur periodically (e.g., every minute, every five minutes, every hour etc.). In other examples, the determination of the location correction factor may occur continuously. The determination of when to determine and/or apply the location correction factor to the determined location of the light electric vehicle 230 may occur dynamically.

For example, the location correction factor may be applied to one or more light electric vehicles 230 when an individual uses her computing device 240 to reserve a light electric vehicle 230. In another example, the light electric vehicle management system 205 may apply a location correction factor to a location of the light electric vehicle 230 based on a current location of the light electric vehicle 230. In yet another example, the light electric vehicle management system 205 may apply a location correction factor to a determined location of a light electric vehicle 230 based on an anticipated destination of the light electric vehicle 230. Each of these examples will be discussed in more detail below.

When an individual wants to reserve and use a light electric vehicle 230, the individual may access an application executing on the computing device 240 and submit a reservation request (also referred to a use request), over the network 225, to the light electric vehicle management system 205. In some examples, the application executing on the computing device 240 may provide rider profile information 245 to the rider profile system 210 of the light electric vehicle management system 205.

The rider profile information 245 may contain profile information about the individual that submitted the reservation request or use request. In some examples, the rider profile information 245 may contain information about the number of times the individual has reserved and/or used light electric vehicles 230, one or more routes taken by the individual while using light electric vehicles 230, the times of day and/or days of the week the individual reserved and/or used light electric vehicles 230, light electric vehicle riding habits of the individual (e.g., how fast the individual typically rides light electric vehicles 230, a pedaling cadence of the individual, amount of power of a rechargeable battery that is typically consumed by the light electric vehicle 230), and so on.

For example, the rider profile information 245 may include information that indicates that the individual typically reserves a light electric vehicle 230 on Monday, Wednesday and Friday mornings at 7:00 AM. The rider profile information 245 may also indicate that the individual typically reserves the light electric vehicle 230 at or near a particular origin (e.g., near the individual's home) and travels a particular route to a particular destination (e.g., to the individual's work). Likewise, the rider profile information 245 may indicate that the individual typically reserves a light electric vehicle 230 on Monday, Wednesday and Friday evenings at 6:00 PM and takes a particular route from an origin (e.g., the individual's work) to a destination (e.g., the individual's home).

The rider profile information 245 may also include information about light electric vehicle riding habits of the individual along the particular route, on those particular days and/or those particular times of the day. For example, the rider profile information 245 may indicate that the individual typically rides ten miles-per-hour during the individual's morning commute from the particular origin to the particular destination. The rider profile information 245 may also indicate that the individual pedals at a particular cadence and causes the light electric vehicle 230 to consume five percent of the power in a rechargeable battery of the light electric vehicle 230.

The rider profile information 245 may be provided to the rider profile system 210 each time a light electric vehicle 230 is reserved and/or used by the individual. In other examples, the rider profile system 210 may receive and use sign-in credentials from the computing device 240 associated with the individual to access rider profile information 245 that has been securely stored in the rider profile system 210. The stored rider profile information 245 may be updated as new or additional information (e.g., additional routes taken by the individual, changes in riding habits, etc.) is received from the computing device 240 and/or light electric vehicle 230.

For example, the rider profile information 245 may include rider habit information and/or route information associated with the individual. The rider habit information and/or route information may be provided to the rider profile system 210 in real-time or substantially real-time as the individual is riding a light electric vehicle 230. Thus, the light electric vehicle management system 205 may be able to detect changes to the individual's riding habits and/or route information and determine, in real-time or substantially real-time, a current location and/or an anticipated destination of the individual.

Although the above examples indicate that route information and/or rider habit information is received from a computing device 240, in some examples, the rider profile system 210 may receive route information, rider habit information, reservation information and/or origin/destination information of the individual from the light electric vehicle 230. For example, the light electric vehicle 230 may provide GPS data or other location information to the light electric vehicle management system 205. Likewise, the light electric vehicle management system 205 may receive rider habit information (e.g., gear ratio shifting habits, average speed, pedaling cadence, etc.) from the light electric vehicle 230. The light electric vehicle management system 205 may store the received information in the rider profile system 210 associated with the individual that reserved and is riding the light electric vehicle 230. In some examples, the route information and/or location information of the light electric vehicle 230 may be received and/or stored by the location management system 220.

Continuing with the example above, when a light electric vehicle use request is received by the light electric vehicle management system 205, the light electric vehicle management system 205 may receive or otherwise determine a current location of the requesting individual. The location management system 220 may also identify one or more light electric vehicles 230 that are in or are otherwise associated with the location of the requesting individual.

The location management system 220 may then request (or have previously received) a reference location 255 from a stationary reference point 250 associated with the location of the individual. The location management system 220 may then determine, using the reference location 255 and the known location of the stationary reference point 250, a location correction factor that can be applied to the location of the individual and/or the location of the light electric vehicles 230 associated with the location of the individual.

Figure 2B:
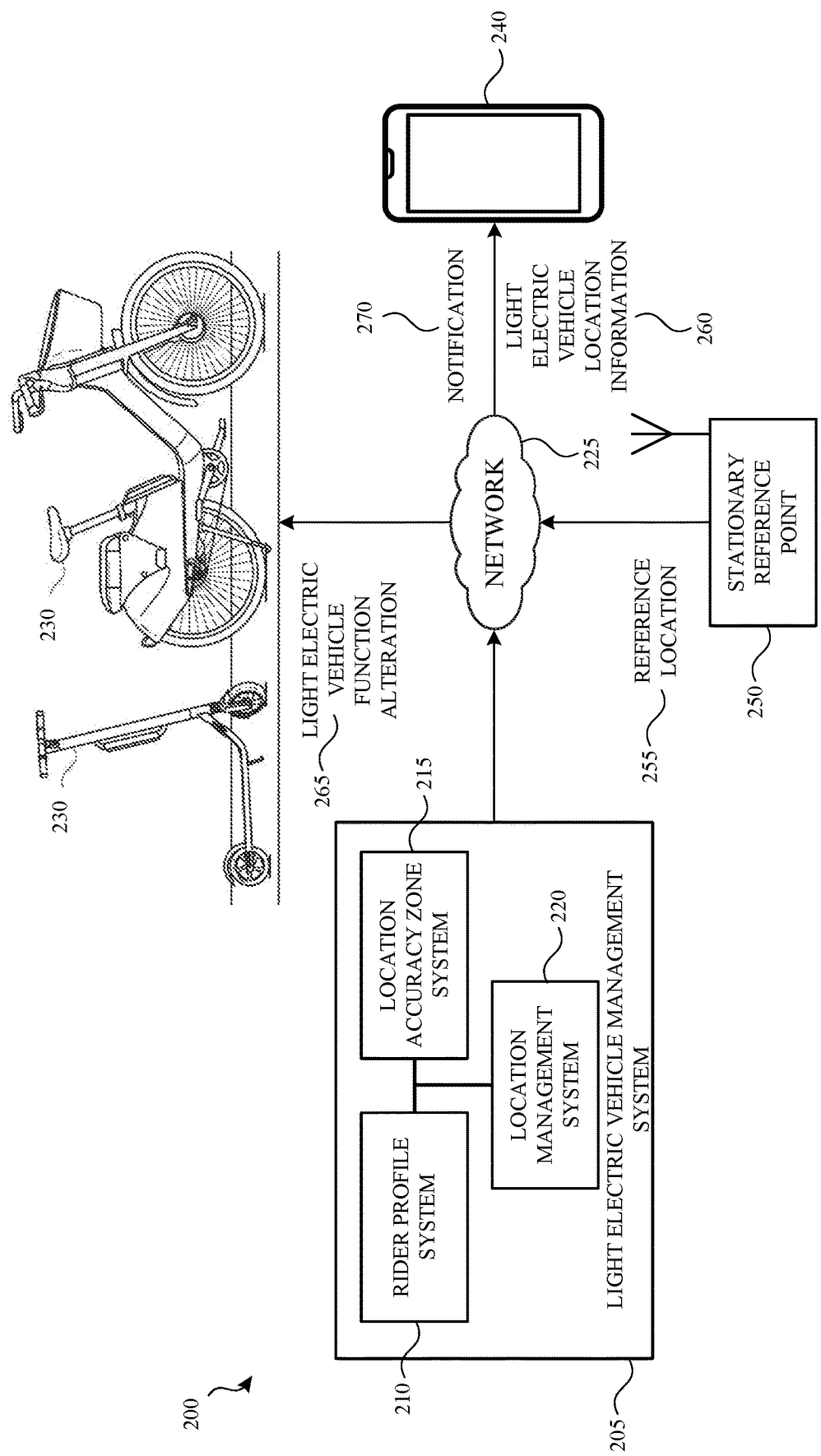
FIG. 2B illustrates the light electric vehicle management system of FIG. 2A sending instructions to a light electric vehicle to alter one or more operating parameters of the light electric vehicle based on its location and also providing location information to one or more computing devices according to an example.

Referring to FIG. 2B, once the location correction factor is applied to the location of the individual and/or the light electric vehicles 230 in the geographic area associated with the location of the individual, the location management system 220 provides light electric vehicle location information 260 to the computing device 240 associated with the individual. In some examples, the light electric vehicle location information 260 may be provided on a user interface of an application being executed on the computing device 240.

Figure 3A:
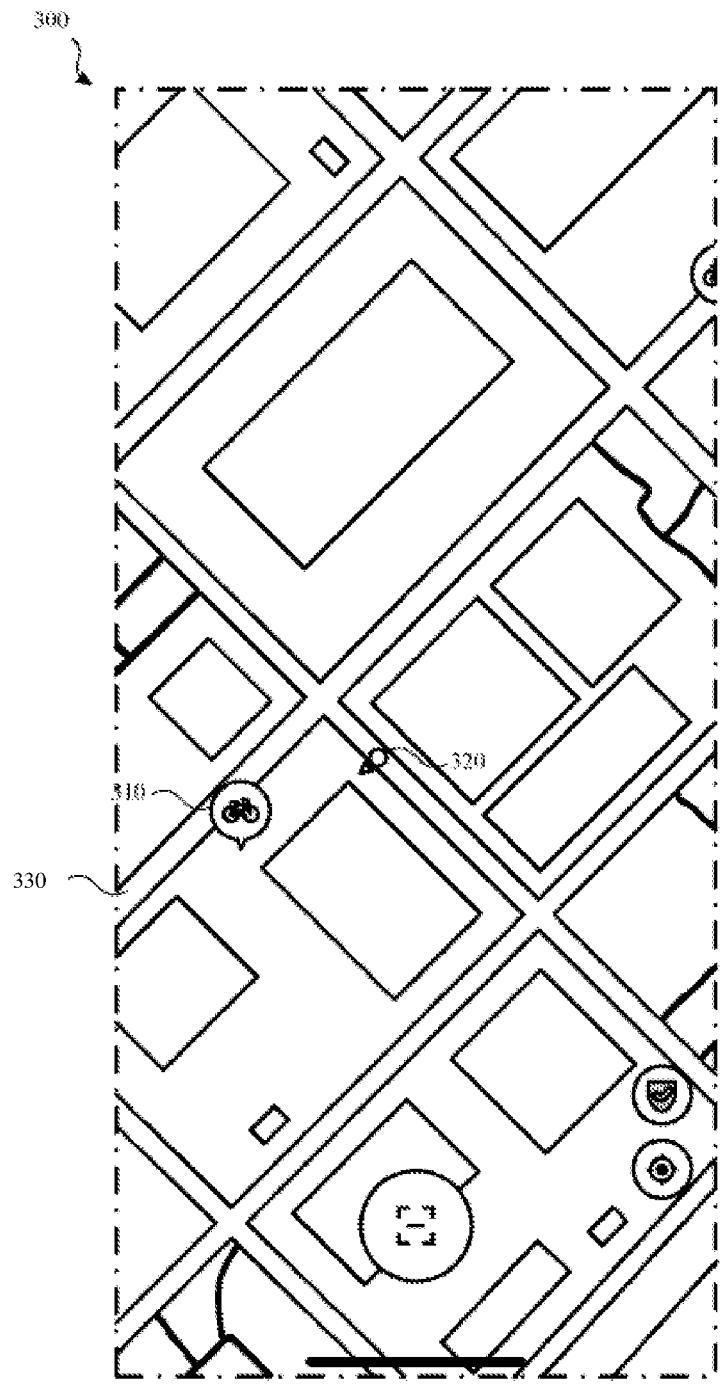
FIG. 3A illustrates an example user interface that shows a location of a light electric vehicle according to an example.

For example and referring to FIG. 3A, when an individual submits a use request for a light electric vehicle, the computing device of the requesting individual may provide a user interface 300 that displays a location of a light electric vehicle (represented by icon 310) and a current location of the individual 320 on a map 330. However, in this example, the location of the individual 320 and the location of the light electric vehicle may be inaccurate.

Figure 3B:
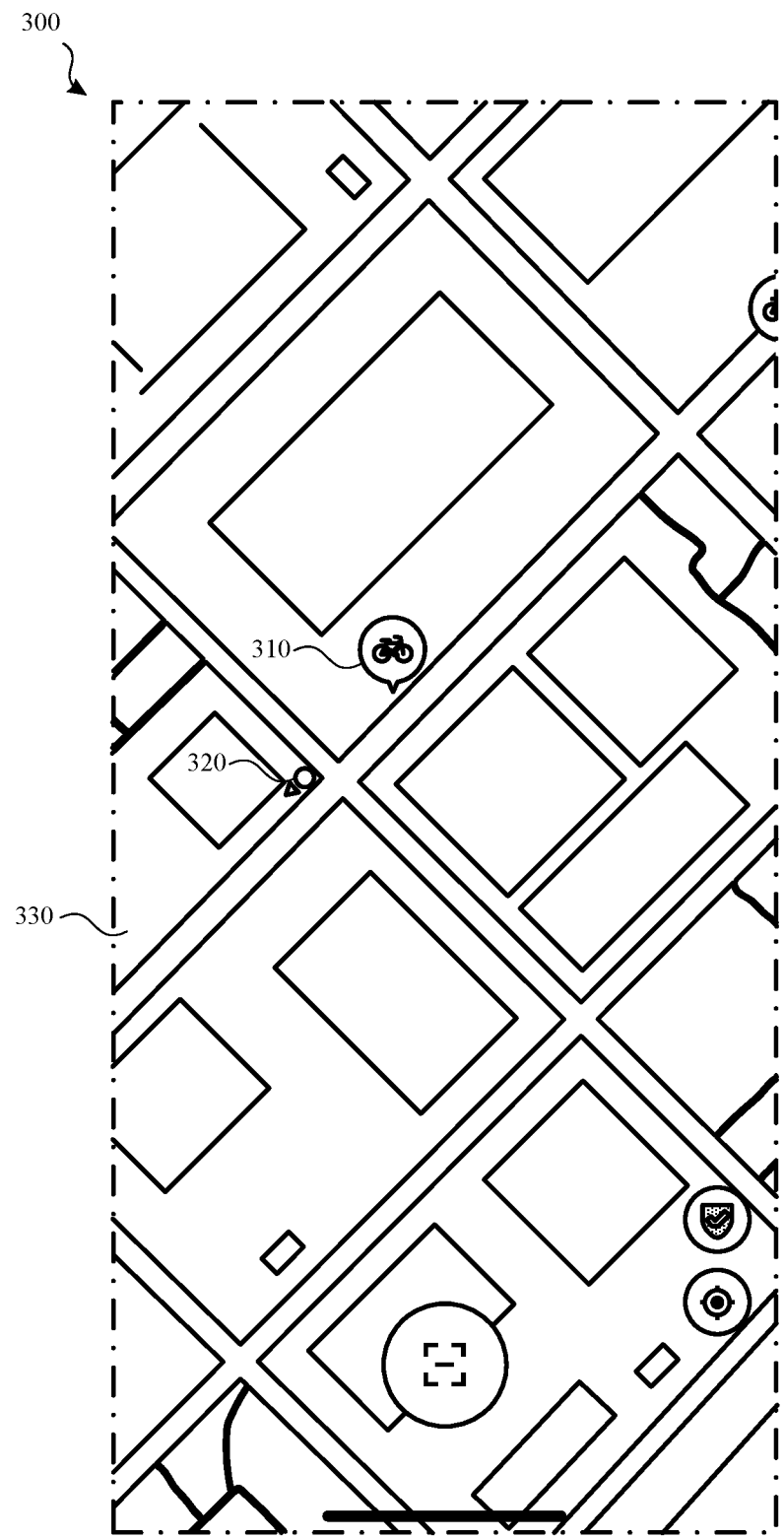
FIG. 3B illustrates the example user interface of FIG. 3A in which a location of the light electric vehicle has been updated according to an example.

As such, a light electric vehicle management system (e.g., light electric vehicle management system 205 (FIG. 2A)) may determine a location correction factor such as described above. Once the location correction factor has been determined, the location correction factor may be applied to the determined location of the individual and/or the determined location of the light electric vehicle. The updated location of the individual 320 and the updated location of the light electric vehicle (represented by icon 310) is shown in FIG. 3B.

In another example and referring back to FIG. 2A, the light electric vehicle management system 205 may dynamically apply a location correction factor to a light electric vehicle 230 based on a current location of the light electric vehicle 230.

The light electric vehicle management system 205 may include a location accuracy zone system 215. The location accuracy zone system 215 may store information about various regions, locations and/or areas within a particular geographic area in which increased location accuracy of light electric vehicles 230 would be beneficial.

As described above, some towns, cities, and municipalities may prohibit the reservation, use, and/or return of light electric vehicles 230 at certain locations, known as location accuracy zones. For example, in a city with a boardwalk (e.g., Atlantic City) or pier (e.g., Santa Monica) or other high traffic areas (e.g. pedestrian paths), the reservation, use, and/or return of light electric vehicles 230 may be prohibited or restricted by that city. As such, it is important to accurately determine whether a light electric vehicle 230 is approaching a location accuracy zone, is within a predetermined distance from the location accuracy zone and/or whether an individual is attempting to ride, park or reserve a light electric vehicle in a location accuracy zone.

As described above, the light electric vehicle management system 205 may periodically or continuously request and/or receive location information (e.g., as part of light electric vehicle information 235) from a light electric vehicle 230 and/or a computing device 240 associated with the individual that is riding the light electric vehicle 230. As this location information is received, the light electric vehicle management system 205 may detect or otherwise determine, using information stored in the location accuracy zone system 215, whether the light electric vehicle 230 is approaching, is within a predetermined distance from, or is otherwise operating in a location accuracy zone. For example, if the light electric vehicle 230 is within fifty feet of a location accuracy zone but the light electric vehicle management system 205 determines, based on inaccurate location information, that the light electric vehicle 230 is within the location accuracy zone, one or more operating parameters of the light electric vehicle may be unnecessarily restricted or altered.

In order to verify whether the light electric vehicle 230 is approaching, is within a predetermined distance from, or is otherwise operating in a location accuracy zone, the location management system 220 may determine a location correction factor associated with a detected location of the light electric vehicle 230 in the same manner as described above. Once the location correction factor is determined, the location management system 220 may apply the location correction factor to the current location of the light electric vehicle 230.

If, based on the updated location, it is determined the light electric vehicle 230 is operating in a location accuracy zone, the light electric vehicle management system 205 may change one or more operating parameters of the light electric vehicle 230. For example and referring to FIG. 2B, the light electric vehicle management system 205 may provide light electric vehicle function alteration instructions 265 to the light electric vehicle 230.

The light electric vehicle function alteration instructions 265 may include instructions that prevent a motor of the light electric vehicle 230 from operating. In another example, the light electric vehicle function alteration instructions 265 may cause the light electric vehicle 230 to reduce a maximum speed. In another example, if the individual is attempting to end a use period of the light electric vehicle 230 by parking the light electric vehicle 230 in the location accuracy zone, the light electric vehicle management system 205 may prevent the individual from ending the use period. Likewise, if an individual is attempting to reserve a light electric vehicle 230 that is located within the location accuracy zone, the light electric vehicle management system 205 may prevent the individual from submitting a reservation or use request or not process a received reservation or use request.

In examples in which the functionality or operating parameters of the light electric vehicle 230 are altered, the light electric vehicle management system 205 may provide a notification 270 to the computing device 240 associated with the individual. The notification 270 may provide the individual with instructions as to how to leave the location accuracy zone and/or why the light electric vehicle 230 is not functioning, why the light electric vehicle 230 cannot be reserved and/or why a use or reservation period of the light electric vehicle 230 cannot be ended.

In some examples, the light electric vehicle 230 may include a display. In such examples, the display of the light electric vehicle 230 may provide the notification 270 such as previously described. In another example, the light electric vehicle 230 may provide one or more haptic notifications and/or audible notifications to notify the individual that the individual is approaching and/or is in a location accuracy zone.

The light electric vehicle management system 205 may also dynamically apply a location correction factor to a light electric vehicle 230 based on an anticipated destination of the light electric vehicle 230.

For example, the light electric vehicle management system 205 may also be able to accurately predict, determine and/or anticipate a route of travel of the individual using the rider profile information 245. For example, if the individual reserves the light electric vehicle 230 at 7:00 AM on Monday morning, the light electric vehicle management system 205 may determine, based on rider profile information 245, that the individual is going to work. The light electric vehicle management system 205 may also determine, using rider profile information 245, that the individual will most likely take a particular route on the way to work. In this example, the particular route may cause the light electric vehicle 230 to pass by a location accuracy zone. As such, as the light electric vehicle 230 approaches the location accuracy zone, a location correction factor may be dynamically applied to the determined location of the light electric vehicle 230 to determine whether the light electric vehicle actually enters the location accuracy zone.

If the individual enters the location accuracy zone, the light electric vehicle management system 205 may provide light electric vehicle function alteration instructions 265 to the light electric vehicle 230. Additionally, the light electric vehicle management system 205 may provide a notification 270 to a computing device 240 and/or a light electric vehicle 230 such as previously described.

Although specific use cases have been discussed, these are for example purposes only and were used to demonstrate that a location correction factor may be dynamically applied to a light electric vehicle 230 based on a detected or determined location. In other cases, the location correction factor may be applied to light electric vehicles 230 in an urban canyon. For example, if a light electric vehicle is located in an urban canyon, the location correction factor may be applied more frequently. In other examples, the location correction factor may be combined with other signals that help increase the accuracy of the location of the light electric vehicle 230. For example, while in an urban canyon, one or more components of the light electric vehicle 230 may be able to utilize a cellular signal and/or a Wi-Fi signal, in combination with GPS information and the location correction factor to more accurately determine a location of the light electric vehicle 230.

As also described, the location correction factor may be determined and applied to various users of a vehicle ridesharing system. For example, when an individual requests a ride in a ridesharing application executing on a computing device, a driver may accept the ride request and a location of the requesting individual is provided to a computing device of the driver. Likewise, the requesting individual may be provided with a location at which to meet the driver. Once, the ride request is received and/or accepted, a location correction factor may be applied to a determined location of the requesting individual and/or the driver of the ridesharing vehicle. As such, both the driver and the requesting individual may be better able to determine an accurate meeting point.

Figure 4:
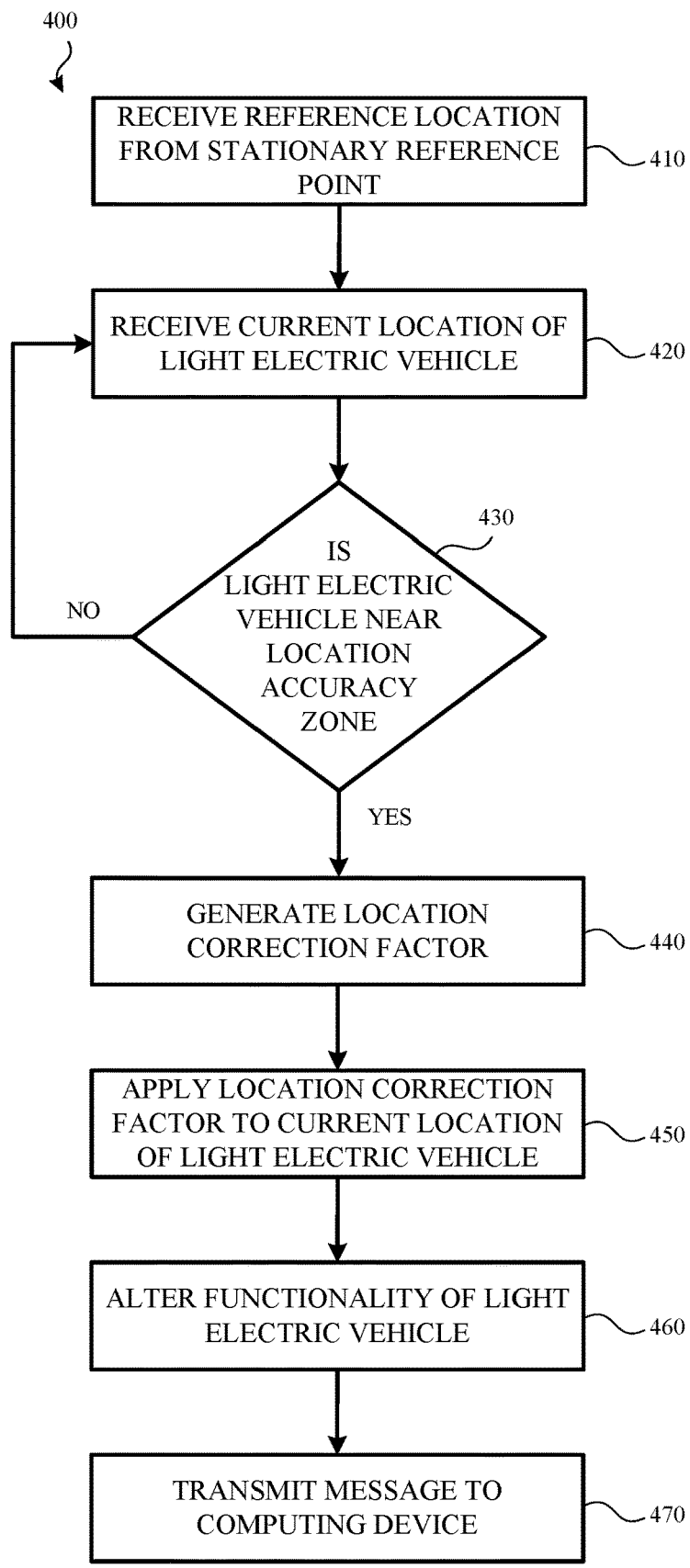
FIG. 4 illustrates a method for detecting a location of a light electric vehicle and altering a functionality of the light electric vehicle according to an example.

FIG. 4 illustrates a method 400 for determining an accurate location of a light electric vehicle according to an example. The method 400 may be performed by one or more of the systems shown and described with respect to FIG. 2A-FIG. 2B.

Method 400 begins when a light electric vehicle management system receives (410) a reference location from a stationary reference point. In examples, the stationary reference point may be an operations depot associated with a fleet of light electric vehicles. In another example, the stationary reference point may be a rechargeable battery kiosk that houses rechargeable batteries for a fleet of light electric vehicles. The stationary reference point may have one or more antennas or other location determination components that are used to gather GPS signals from various GPS satellites (or other such location information).

The light electric vehicle management system may receive a reference location from various stationary reference points. For example, a particular geographic area may have multiple different stationary reference points at different locations. As such, the light electric vehicle management system may receive a number of different reference locations.

The light electric vehicle management system may also receive (420) a current location of a light electric vehicle. The current location of the light electric vehicle may be provided to the light electric vehicle management system by a GPS associated or integrated with a light electric vehicle. In another example, if the light electric vehicle is being used by an individual, the current location of the light electric vehicle may be provided by a computing device associated with the individual.

When the reference location and the light electric vehicle location information are received, the light electric vehicle management system may determine (430) whether the light electric vehicle is within a predetermined distance (e.g., one mile or less, five hundred feet or less, etc.) from a location accuracy zone. If the light electric vehicle management system determines the light electric vehicle is not within a predetermined distance from the location accuracy zone, the light electric vehicle management system may continue to monitor or otherwise receive (420) location information for the light electric vehicle.

However, if it is determined the light electric vehicle is within a predetermined distance of the location accuracy zone, or if profile information associated with an individual indicates that a particular route will take the individual near or through a location accuracy zone, the light electric vehicle management system generates (440) a location correction factor using the reference location. The location correction factor may be generated in a similar manner as was described above.

The location correction factor may then be applied (450) to the current location of the light electric vehicle. In some examples, the location correction factor may be continuously applied to the location of the light electric vehicle as location information of the light electric vehicle continues to be received by the light electric vehicle management system. For example, as the light electric vehicle approaches (or is in) the location accuracy zone, the location correction factor may be applied to the location information each time the location information about the light electric vehicle is received by the light electric vehicle management system.

If the light electric vehicle enters or is within a predetermined distance from the location accuracy zone, the light electric vehicle management system may provide instructions to the light electric vehicle that alter (460) one or more operating parameters of the light electric vehicle. For example, a top speed of the light electric vehicle may be reduced. In another example, an electric assist motor of the light electric vehicle may stop providing power while the light electric vehicle is in or within the predetermined distance of the location accuracy zone. In yet another example, a use or reservation period may not be started or ended in a location accuracy zone and/or within a predetermined distance from the location accuracy zone.

If the functionality of the light electric vehicle is altered, the light electric vehicle management system may provide (470) a notification to the light electric vehicle and/or a computing device associated with the individual that is riding the light electric vehicle.

Figure 5:
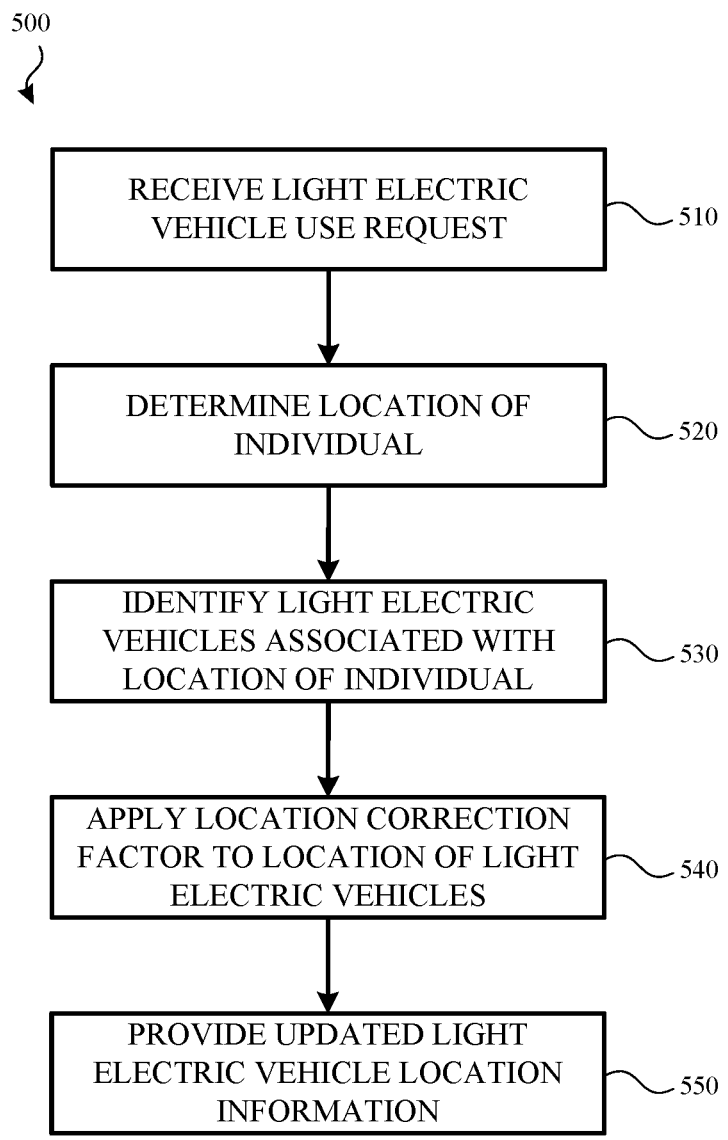
FIG. 5 illustrates a method for determining a location of a light electric vehicle according to an example.

FIG. 5 illustrates a method 500 for determining an accurate location of a light electric vehicle according to an example. The method 500 may be performed in response to an individual submitting a use or reservation request such as described above. As with method 400 of FIG. 4, method 500 may be performed by one or more systems shown and described with respect to FIG. 2A-FIG. 2B.

Method 500 begins when a light electric vehicle use request is received (510) by a system, such as, for example, a light electric vehicle management system. In some examples, the light electric vehicle use request is provided by an application executing on a computing device associated with an individual that wants to reserve and use a light electric vehicle. The use request may contain profile information associated with the individual.

The profile information may include or otherwise be used to determine (520) a location of the individual that is associated with or that otherwise submitted the light electric vehicle use request. In some examples, the riding habits, including past routes taken by the individual, may be included or otherwise be associated with the light electric vehicle use request. In some examples, the location information may be based on GPS data or other location-based data received from a computing device associated with the individual. The location information of the individual may be included or otherwise be associated with the use request. The location information may be used to identify (530) one or more light electric vehicles in an area that are associated with the location of the individual.

Once the location information of the individual and the location information of the light electric vehicle is received or otherwise determined by the light electric vehicle management system, a location correction factor may be applied to one or both of the location of the light electric vehicle and the location of the individual. The location correction factor may be determined using the various processes described herein.

The light electric vehicle management system may then provide (550) updated light electric vehicle information (or an updated location of the individual) to a remote computing device (e.g., the computing device associated with the individual). An example of this is provided with respect to FIG. 3A and FIG. 3B.

Figure 6:
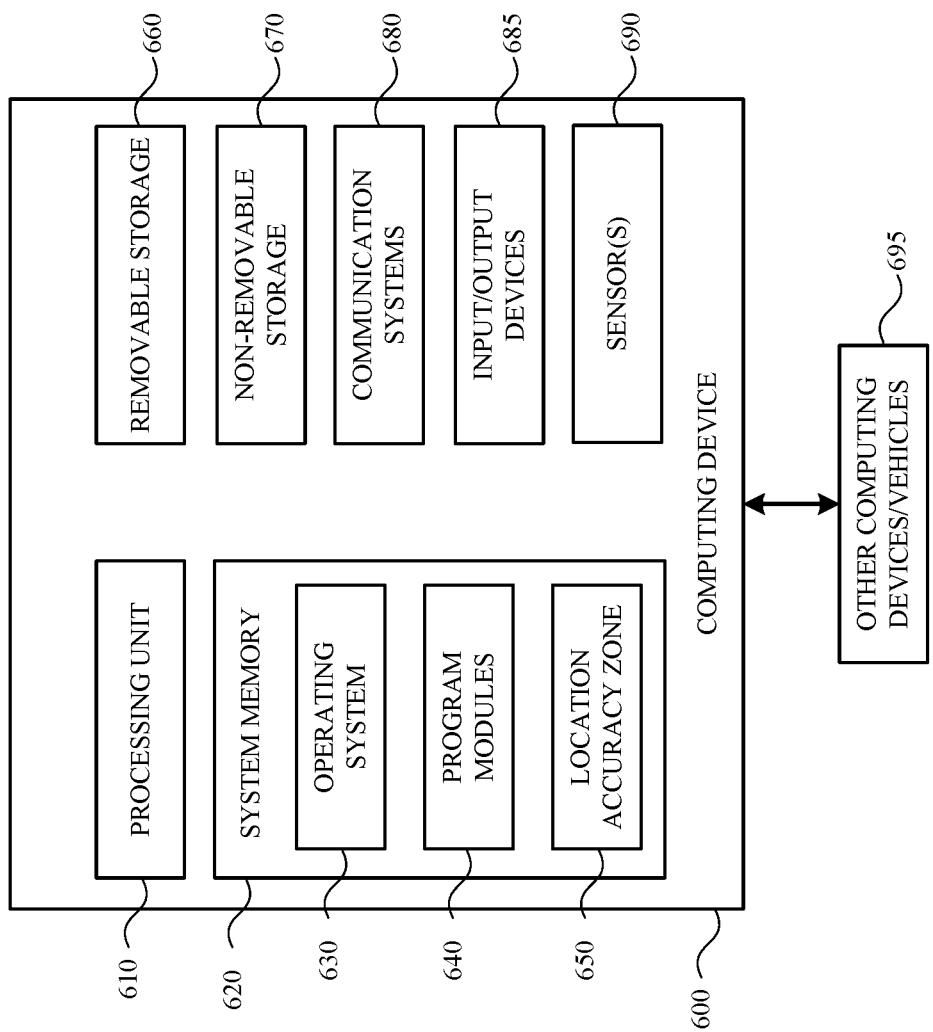
FIG. 6 illustrates an example computing device that may be used by a light electric vehicle and/or the systems described herein.

FIG. 6 is a system diagram of a computing device 600 according to an example. The computing device 600 may be integrated with or associated with a light electric vehicle, such as light electric vehicle 230 shown and described with respect to FIG. 2A-FIG. 2B. The computing device 600 may also be associated or otherwise integrated with the various systems shown and described with respect to FIG. 1-FIG. 2B. As shown in FIG. 6, the physical components (e.g., hardware) of the computing are illustrated and these physical components may be used to practice the various aspects of the present disclosure.

The computing device 600 may include at least one processing unit 610 and a system memory 620. The system memory 620 may include, but is not limited to, volatile storage (e.g., random access memory), non-volatile storage (e.g., read-only memory), flash memory, or any combination of such memories. The system memory 620 may also include an operating system 630 that control the operation of the computing device 600 and one or more program modules 640. The program modules 640 may be responsible for gathering or determining rider profile information, light electric vehicle information, including location information, riding habit information, and so on. The memory may also store location accuracy zone information 650 or otherwise provide access to this information. A number of different program modules and data files may be stored in the system memory 620. While executing on the processing unit 610, the program modules 640 may perform the various processes described above.

The computing device 600 may also have additional features or functionality. For example, the computing device 600 may include additional data storage devices (e.g., removable and/or non-removable storage devices) such as, for example, magnetic disks, optical disks, or tape. These additional storage devices are labeled as a removable storage 660 and a non-removable storage 670.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 6 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 600 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced using a computing device associated with or integrated with the electric vehicle and/or in any other circuits or systems.

The computing device 600 may include one or more communication systems 680 that enable the electric vehicle to communicate with rechargeable batteries, other computing devices 695 (e.g., remote computing devices and/or light electric vehicles), a network service and the like. Examples of communication systems 680 include, but are not limited to, radio frequency (RF) transmitter, receiver, and/or transceiver circuitry, a Controller Area Network (CAN) bus, a universal serial bus (USB), parallel, and/or serial ports.

The computing device 600 may also have one or more input devices and/or one or more output devices shown as input/output devices 685. These input/output devices 685 may include a keyboard, a sound or voice input device, haptic devices, a touch, force and/or swipe input device, a display, speakers, etc. The aforementioned devices are examples and others may be used.

The computing device 600 may also include one or more sensors 690. The sensors may be used to detect or otherwise provide information about the operating condition of the light electric vehicle. In other examples, the sensors 690 may provide information about a light electric vehicle to which the computing device 600 is associated. For example, the sensors 690 may include a tire pressure sensor, a location sensor, an image sensor, a speed sensor, a tire alignment sensor, a rechargeable battery sensor and so on.

The term computer-readable media as used herein may include computer storage media. Computer storage media may include volatile and nonvolatile, removable and non-removable media implemented in any method or technology for storage of information, such as computer readable instructions, data structures, or program modules.

The system memory 620, the removable storage 660, and the non-removable storage 670 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In some examples, the present disclosure describes a computer-implemented method, comprising: receiving a reference location from a stationary reference point, wherein the stationary reference point is at least one of an operations depot associated with a fleet of light electric vehicles or a rechargeable battery kiosk for a rechargeable battery of the fleet of light electric vehicles; receiving a current location from a light electric vehicle of the fleet of light electric vehicles; determining that the current location of the light electric vehicle is within a predetermined distance of a location accuracy zone associated with a geographic location; applying a location correction factor to the current location of the light electric vehicle to generate an updated location for the light electric vehicle, wherein the location correction factor is applied to the current location of the light electric vehicle based, at least in part, on the determination that the current location of the light electric vehicle is within the predetermined distance of the location accuracy zone, and wherein the location correction factor is based, at least in part, on the reference location; and transmitting the updated location to a remote computing device. In some examples, the method further comprises altering a functionality of the light electric vehicle based, at least in part, on the updated location. In some examples, the reference location is received in response to receiving a light electric vehicle use request. In some examples, the method further comprises determining an anticipated route of the light electric vehicle. In some examples, the method further comprises determining an anticipated destination of the light electric vehicle based, at least in part, on a rider profile associated with a rider of the light electric vehicle. In some examples, the method further comprises determining whether the anticipated destination is associated with the location accuracy zone. In some examples, transmitting the updated location to the remote computing device comprises transmitting the updated location to a remote computing system that is configured to perform at least one of: storing the updated location associated with the light electric vehicle or transmitting the updated location information for presentation in a user interface of an application running on a computing device, the application allowing a user to reserve the light electric vehicle for use.

A system is also described. In some examples, the system comprises at least one processor; and a memory communicatively coupled to the at least one processor and storing instructions that, when executed by the at least one processor, perform operations, comprising: receiving a light electric vehicle use request from a computing device associated with an individual; determining a location of the individual based, at least in part, on the light electric vehicle use request; determining a light electric vehicle location for a light electric vehicle, wherein the light electric vehicle location is associated with the location of the individual; applying a location correction factor to the light electric vehicle to generate an updated light electric vehicle location for the light electric vehicle, the location correction factor being based, at least in part, on a reference location of a stationary reference point, wherein the stationary reference point is at least one of an operations depot associated with a fleet of light electric vehicles or a rechargeable battery kiosk for a rechargeable battery of the fleet of light electric vehicles; and providing the updated light electric vehicle location on a user interface of the computing device. In some examples, the memory may store instructions for determining whether the light electric vehicle location for the light electric vehicle is associated with a location accuracy zone. In some examples, the location accuracy zone is associated with a geographic area. In some examples, the memory may store instructions for determining whether the location of the individual is associated with a location accuracy zone. In some examples, the memory may store instructions for determining whether the light electric vehicle location for the light electric vehicle is associated with a location accuracy zone. In some examples, the memory may store instructions for determining the location correction factor.

Also described is a method, comprising: receiving a current location of a light electric vehicle; determining that the current location of the light electric vehicle is within a predetermined distance from a location accuracy zone associated with a geographic location; requesting a reference location from a stationary reference point, wherein the stationary reference point is at least one of an operations depot associated with a fleet of light electric vehicles or a battery charging kiosk for a rechargeable battery of the fleet of light electric vehicles; generating a location correction factor based, at least in part, on the reference location; and applying the correction factor to the current location of the light electric vehicle to generate an updated current location of the light electric vehicle. In some examples, the method further comprises providing the updated current location of the light electric vehicle to a remote computing device. In some examples, the method further comprises limiting a function of the light electric vehicle based, at least in part, on the updated current location of the light electric vehicle. In some examples, limiting a function of the light electric vehicle comprises preventing a use request from being transmitted to a light electric vehicle management system. In some examples, the method further comprises receiving a light electric vehicle use request from a computing device associated with an individual. In some examples, determining whether the current location of the light electric vehicle is within the predetermined distance from the location accuracy zone occurs in response to the receiving the light electric vehicle use request. In some examples, the method further comprises determining whether the location accuracy zone is located along a route taken by the individual.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A computer-implemented method, comprising:
   receiving a reference location from a stationary reference point,
   wherein the stationary reference point is at least one of an operations depot associated with a fleet of light electric vehicles or a rechargeable battery kiosk for a rechargeable battery of the fleet of light electric vehicles;
   receiving a current location from a light electric vehicle of the fleet of light electric vehicles;
   determining that the current location of the light electric vehicle is within a predetermined distance of a location accuracy zone associated with a geographic location;
   in response to determining that the light electric vehicle is within the predetermined distance of the location accuracy zone, applying a location correction factor to the current location of the light electric vehicle to generate an updated location for the light electric vehicle, and
   wherein the location correction factor is based, at least in part, on a comparison between the reference location of the stationary reference point and actual known GPS coordinates of the stationary reference point; and
   transmitting the updated location to a remote computing device.

2. The method of claim 1, further comprising:
   altering a functionality of the light electric vehicle based, at least in part, on the updated location.

3. The method of claim 1, wherein the reference location is received in response to receiving a light electric vehicle use request.

4. The method of claim 1, further comprising:
   determining an anticipated route of the light electric vehicle.

5. The method of claim 1, further comprising:
   determining an anticipated destination of the light electric vehicle based, at least in part, on a rider profile associated with a rider of the light electric vehicle.

6. The method of claim 5, further comprising:
   determining whether the anticipated destination is associated with the location accuracy zone.

7. The method of claim 1, wherein transmitting the updated location to the remote computing device comprises transmitting the updated location to a remote computing system that is configured to perform at least one of:
   storing the updated location associated with the light electric vehicle, or transmitting the updated location information for presentation in a user interface of an application running on a computing device, the application allowing a user to reserve the light electric vehicle for use.

8. A system, comprising:
   at least one processor; and
   a memory communicatively coupled to the at least one processor and storing instructions that, when executed by the at least one processor, perform operations, comprising:
      receiving a light electric vehicle use request from a computing device associated with an individual;
      determining a location of the individual based, at least in part, on the light electric vehicle use request;
      determining a light electric vehicle location for a light electric vehicle,
      wherein the light electric vehicle location is associated with the location of the individual;
      in response to determining that the light electric vehicle is within the predetermined distance of the location accuracy zone, applying a location correction factor to the light electric vehicle to generate an updated light electric vehicle location for the light electric vehicle, the location correction factor being based, at least in part, on comparison of a reference location of a stationary reference point and actual known GPS coordinates of the stationary reference point,
      wherein the stationary reference point is at least one of an operations depot associated with a fleet of light electric vehicles or a rechargeable battery kiosk for a rechargeable battery of the fleet of light electric vehicles; and
      providing the updated light electric vehicle location on a user interface of the computing device.

9. The system of claim 8, further comprising:
   instructions for determining whether the light electric vehicle location for the light electric vehicle is associated with a location accuracy zone.

10. The system of claim 9, wherein the location accuracy zone is associated with a geographic area.

11. The system of claim 9, further comprising:
    instructions for determining whether the location of the individual is associated with a location accuracy zone.

12. The system of claim 9, further comprising:
    instructions for determining the location correction factor.

13. A method, comprising:
    receiving a current location of a light electric vehicle;
    determining that the current location of the light electric vehicle is within a predetermined distance from a location accuracy zone associated with a geographic location;

requesting a reference location from a stationary reference point, wherein the stationary reference point is at least one of an operations depot associated with a fleet of light electric vehicles or a battery charging kiosk for a rechargeable battery of the fleet of light electric vehicles;

generating a location correction factor based, at least in part, on a comparison between the reference location of the stationary reference point and actual known GPS coordinates of the stationary reference point; and in response to determining that the light electric vehicle is within the predetermined distance of the location accuracy zone, applying the correction factor to the current location of the light electric vehicle to generate an updated current location of the light electric vehicle.

14. The method of claim 13, further comprising:

providing the updated current location of the light electric vehicle to a remote computing device.

15. The method of claim 13, further comprising:

limiting a function of the light electric vehicle based, at least in part, on the updated current location of the light electric vehicle.

16. The method of claim 15, wherein limiting a function of the light electric vehicle comprises preventing a use request from being transmitted to a light electric vehicle management system.

17. The method of claim 13, further comprising:

receiving a light electric vehicle use request from a computing device associated with an individual.

18. The method of claim 17, wherein the determining whether the current location of the light electric vehicle is within the predetermined distance from the location accuracy zone occurs in response to the receiving the light electric vehicle use request.

19. The method of claim 17, further comprising:

determining whether the location accuracy zone is located along a route taken by the individual.

\* \* \* \* \*